(12) United States Patent
Erskine

(10) Patent No.: US 7,600,766 B2
(45) Date of Patent: Oct. 13, 2009

(54) ROLLING INFANT CAR SEAT

(76) Inventor: Sandra Erskine, 1200 Perry Lake Rd., Ortonville, MI (US) 48462

( * ) Notice: Subject to any disclaimer, the term of this patent is extended or adjusted under 35 U.S.C. 154(b) by 340 days.

(21) Appl. No.: 11/421,143

(22) Filed: May 31, 2006

(65) Prior Publication Data
US 2007/0278756 A1 Dec. 6, 2007

(51) Int. Cl.
B62B 7/02 (2006.01)
(52) U.S. Cl. .................. 280/47.25; 280/47.17
(58) Field of Classification Search ............ 280/30, 280/47.131, 47.25, 63, 657, 658, 43, 43.1, 280/47.17, 47.24, 31, 47.15; 297/183.1, 297/183.3, 183.2
See application file for complete search history.

(56) References Cited

U.S. PATENT DOCUMENTS

| 4,989,888 A * | 2/1991 | Qureshi et al. ............ 280/30 |
| 5,022,669 A * | 6/1991 | Johnson .................... 280/30 |
| 5,104,134 A * | 4/1992 | Cone ....................... 280/30 |
| 5,595,393 A * | 1/1997 | Batten ...................... 280/30 |
| 6,367,821 B2 * | 4/2002 | Thiele ...................... 280/30 |
| 6,517,153 B1 * | 2/2003 | Brewer ................. 297/184.13 |
| 6,729,630 B2 * | 5/2004 | Szmidt et al. ........... 280/47.25 |
| 6,854,744 B2 | 2/2005 | Brandler |
| 6,938,915 B2 * | 9/2005 | Bischoff et al. ............ 280/658 |
| 6,986,518 B1 * | 1/2006 | Besaw ...................... 280/30 |

* cited by examiner

Primary Examiner—Christopher P Ellis
Assistant Examiner—Brian Swenson
(74) Attorney, Agent, or Firm—Gregory T. Zalecki

(57) ABSTRACT

A rolling infant car seat is comprised of an infant car seat, a handle, at least one wheel and a secondary handle. The infant car seat has a curved bottom surface for rocking the seat. The handle is pivotally attached to the seat and is adapted to have a plurality of locked positions. Wheels are positioned along the curved bottom surface between the floor contact area and the foot end of the seat. The wheels are shaped and positioned to allow the seat to be rocked and to allow the seat to be propelled by rolling on the wheels. The secondary handle extends from the handle and may be pivoted such that a user grasping the secondary handle may lift the bottom surface of the seat off of the floor while maintaining contact between the wheels and the floor.

22 Claims, 6 Drawing Sheets

ROLLING INFANT CAR SEAT

BACKGROUND

Infant car seats are commonly used to transport infants within motor vehicles. The seat fits within a base. The base is securely attached to a seat within the motor vehicle. The infant seat has a belt system for restraining an infant and protecting the infant in the event of a vehicle collision. When the infant seat is used within a motor vehicle the infant seat is held securely within a base. However, the infant seat is quickly and easily removable from the base.

Most infant car seats have pivoting handles. The handle often serves a secondary purpose of providing a support for toys used to entertain the infant. When the infant seat is removed from the motor vehicle the handle can be locked into a carrying position. This will allow the infant seat to be carried by the handle while the infant is within the infant seat. This provides a quick and easy way to move the infant a short distance from the motor vehicle. However, if the infant seat and infant are carried by the handle for longer distances, the infant seat can feel very heavy and cause the person carrying the seat to become fatigued. Often the person carrying the infant seat is the infant's mother and the infant's mother does not have sufficient strength to carry the infant and seat for long distances comfortably.

Most current infant car seats have a curved bottom surface. The curved surface permits the infant seat to be rocked upon a floor surface. The infant is often soothed and relaxed by the rocking motion. The ability to rock the infant seat also permits the carrier to temporarily stop carrying the infant seat without upsetting the infant.

An infant car seat is needed which has the following features. The infant car seat would releasably fit within a base. In other words, the infant car seat could be snapped into a base and snapped out of a base. The seat could be carried by a handle in the same manner that traditional infant seats can be carried by a handle. The seat could be rocked when placed upon a floor in the same manner that traditional infant seats can be rocked when placed upon a floor. The infant seat would have wheels and a pivoting extendable handle which would permit it to be rolled and transported upon the floor when pulled or pushed by a user. Preferably, the wheels would be retractable. The infant car seat should also have a pivoting hood which, while the seat is being pulled, would suspend child/infant toys near the infant so that the infant can interact with the toys.

SUMMARY

These desirable features are provided by the rolling infant car seat described herein. A rolling infant car seat is comprised of an infant car seat, a handle and at least one wheel. The infant car seat is shaped and configured as a traditional infant seat used to transport infants within motor vehicles. The infant seat fits securely within a base. The base is adapted and configured to releasably secure the infant seat. The base is installed within a motor vehicle. The infant car seat has a bottom surface, a head end and a foot end. The bottom surface has a floor contact area. The bottom surface of the infant car seat is the surface upon which the seat sits when it is placed upon a floor. The bottom surface may be convexly curved to facilitate rocking of the infant seat. The head end of the seat is that end of the seat near the head of an infant placed within the seat. The foot end of the seat is that end of the seat near the foot of an infant placed within the seat. The floor contact area of the bottom surface is that area of the bottom surface which contacts the floor when the seat is placed upon a floor. If the bottom surface of the seat is curved, the floor contact area includes that part of the bottom surface which contacts the floor while the seat is being rocked.

The handle is attached to the infant seat. Preferably, it is pivotally attached to the seat and is capable of being locked into multiple positions. The handle can be used to carry the infant seat with or without an infant positioned within the seat. The handle can also be used to roll the infant seat by pulling or pushing it while the at least one wheel is in contact with the floor.

The at least one wheel is positioned along the bottom surface of the seat. It is positioned between the floor contact area and a peripheral edge of the bottom surface of the infant car seat. The bottom surface has a head end peripheral edge and a foot end peripheral edge. The head end peripheral edge is the edge located at the head end of the infant seat where the bottom surface transitions from a predominantly horizontal orientation to a predominantly non-horizontal orientation. The foot end peripheral edge is the edge located at the foot end of the infant seat where the bottom surface transitions from a predominantly horizontal orientation to a predominantly non-horizontal orientation. The orientations referred to are the orientations relative to an infant seat setting upon a floor surface. The at least one wheel is sized, shaped and positioned such that it will permit the infant car seat to be propelled on the at least one wheel when a part of the bottom surface is lifted above the floor surface while the at least one wheel remains in contact with the floor surface. Preferably, a pair of wheels are positioned along the bottom surface of the seat.

The handle has at least one locked position. This position is set to permit a standing user grasping the handle to lift the bottom surface of the infant car seat off of the floor surface while maintaining contact between the at least one wheel and the floor surface. This permits the infant car seat to be propelled along the floor surface when the user ambulates.

The wheel or wheels may be retractable. If they are retractable they retract within the infant car seat. When the wheel or wheels are retracted a larger rocking angle results. The rocking angle is the angle defined by the angle through which the seat rotates when it is being rocked. The rocking angle becomes greater if the seat may be rocked further forward by removing rocking interference caused by the wheel or wheels.

A hood may be pivotally attached over the infant area of the infant car seat. The hood should have at least one child toy hanging therefrom. The at least one toy is positioned on the hood such that a child within the infant car seat may interact with it when the hood is pivoted such that it covers the foot end of the infant car seat.

DRAWINGS

These and other features, aspects, and advantages of the present invention will become better understood with regard to the following description, appended claims, and accompanying drawings where:

DESCRIPTION

Figure 1:
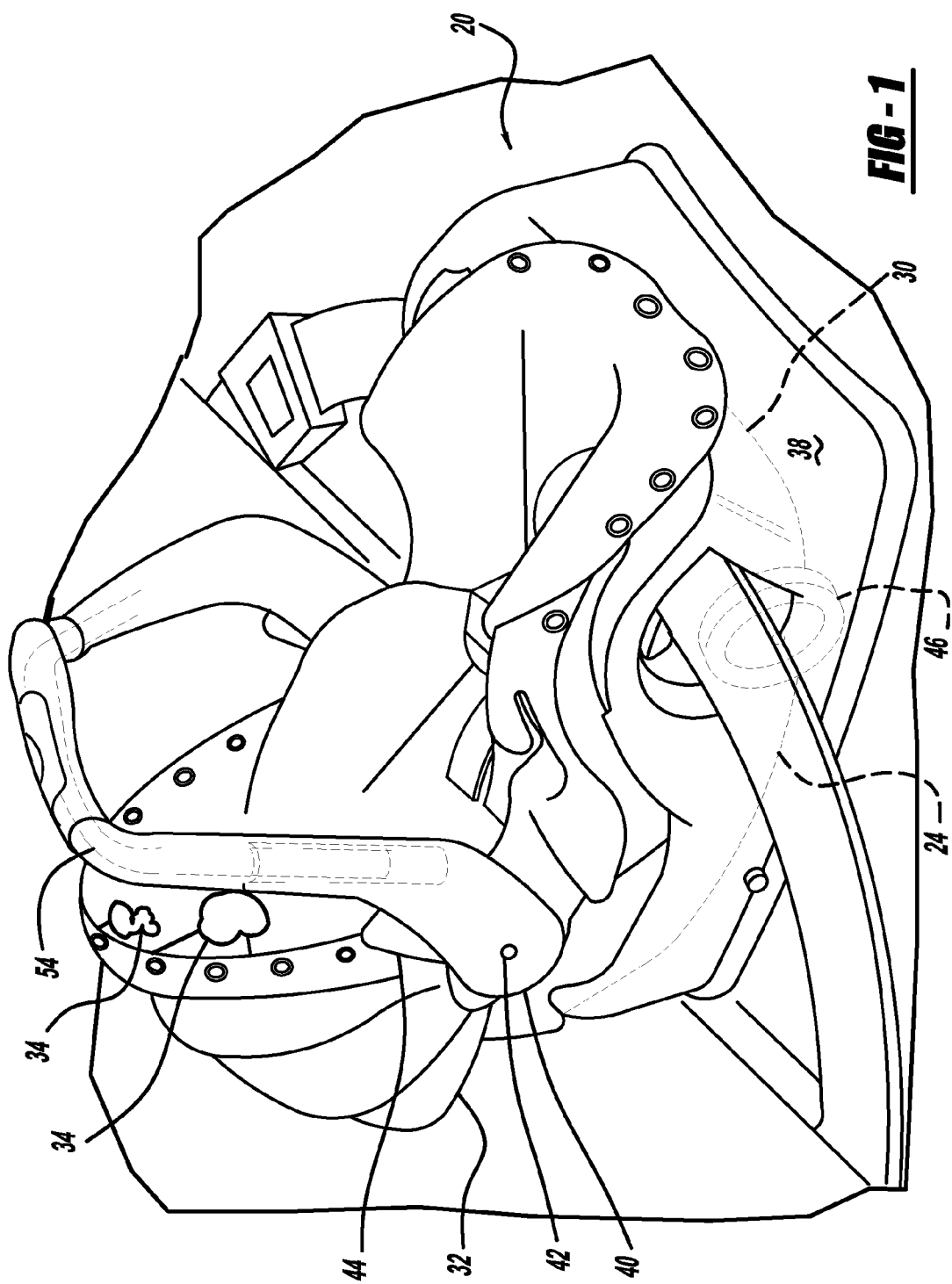
FIG. 1 is a perspective view of a rolling infant car seat secured within a base, wherein the base is attached to the seat of a motor vehicle by a seat belt.

FIG. 1 shows a rolling infant car seat 20 installed within a motor vehicle. An infant car seat base 38 is secured to the seat of the motor vehicle with a seat belt. The preferred embodiment of the rolling infant car seat 20 is comprised of an infant car seat 22, a handle 40, at least one wheel 46 and a secondary extendable handle 54. The base 38 is configured in the shape of a traditional infant car seat base. It is adapted to releasably secure the rolling infant car seat 20. The rolling infant car seat 20 securely locks within the base 38, yet it is easily removable. The base should have spring-loaded locks to retain the seat.

Figure 3:
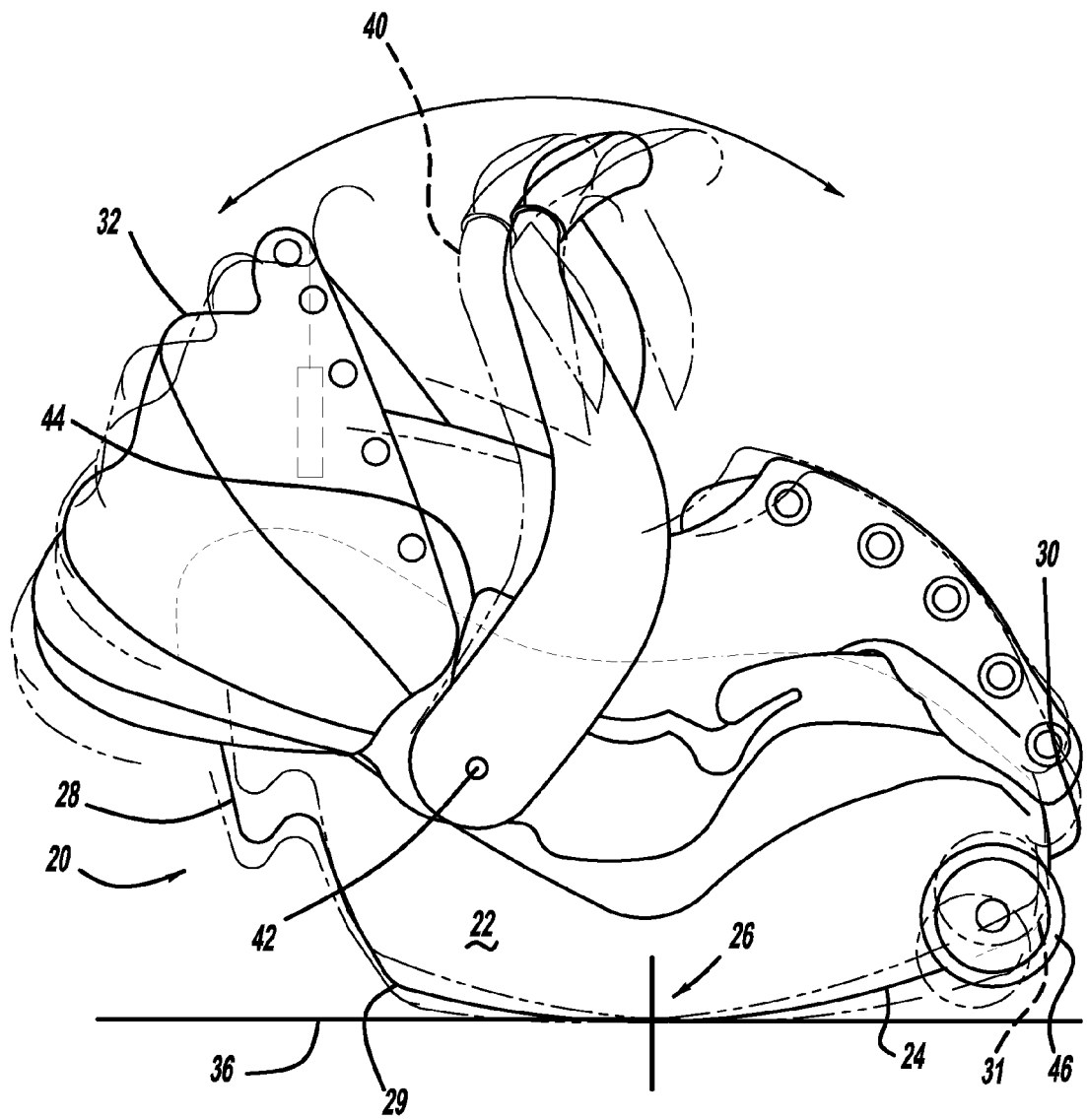
FIG. 3 is a side elevation view of the rolling infant car seat of FIG. 1, showing the ability of the infant car seat to rock upon a floor surface, the handle to pivot and the hood of the infant seat to pivot.

The infant car seat 22 is shaped and configured as a traditional infant car seat which releasably locks into a base. It has a belt restraint system for restraining and protecting an infant in the event of a motor vehicle collision. The infant car seat 22 has a convexly curved bottom surface 24. The convexly curved bottom surface 24 permits the infant seat 22 to be rocked along the curved bottom surface 24 when the curved bottom surface 24 is in contact with a floor 36. The curved bottom surface 24 has a floor contact area 26, as shown in FIG. 3. The floor contact area 26 is that area of the curved bottom surface 24 which contacts the floor 36 while the infant car seat 22 is rocked. The infant seat 22 has a head end 28 and a foot end 30. When an infant is placed within the infant car seat 22 the head end 28 of the seat 22 is that end near the infant's head. The foot end 30 of the seat 22 is that end near the infant's foot. The curved bottom surface 24 has a foot end peripheral edge 31 and a head end peripheral edge 29. FIG. 3 shows that the head end peripheral edge 29 is the edge located at the head end 28 of the infant seat 22 where the curved bottom surface 24 transitions from a predominantly horizontal orientation to a predominantly vertical orientation. FIG. 3 also shows that the foot end peripheral edge 31 is the edge located at the foot end 30 of the infant seat 22 where the curved bottom surface 24 transitions from a predominantly horizontal orientation to a predominantly vertical orientation. The orientations referred to are the orientations relative to an infant seat 22 setting upon a floor surface 36, as shown in FIG. 3.

Figure 4:
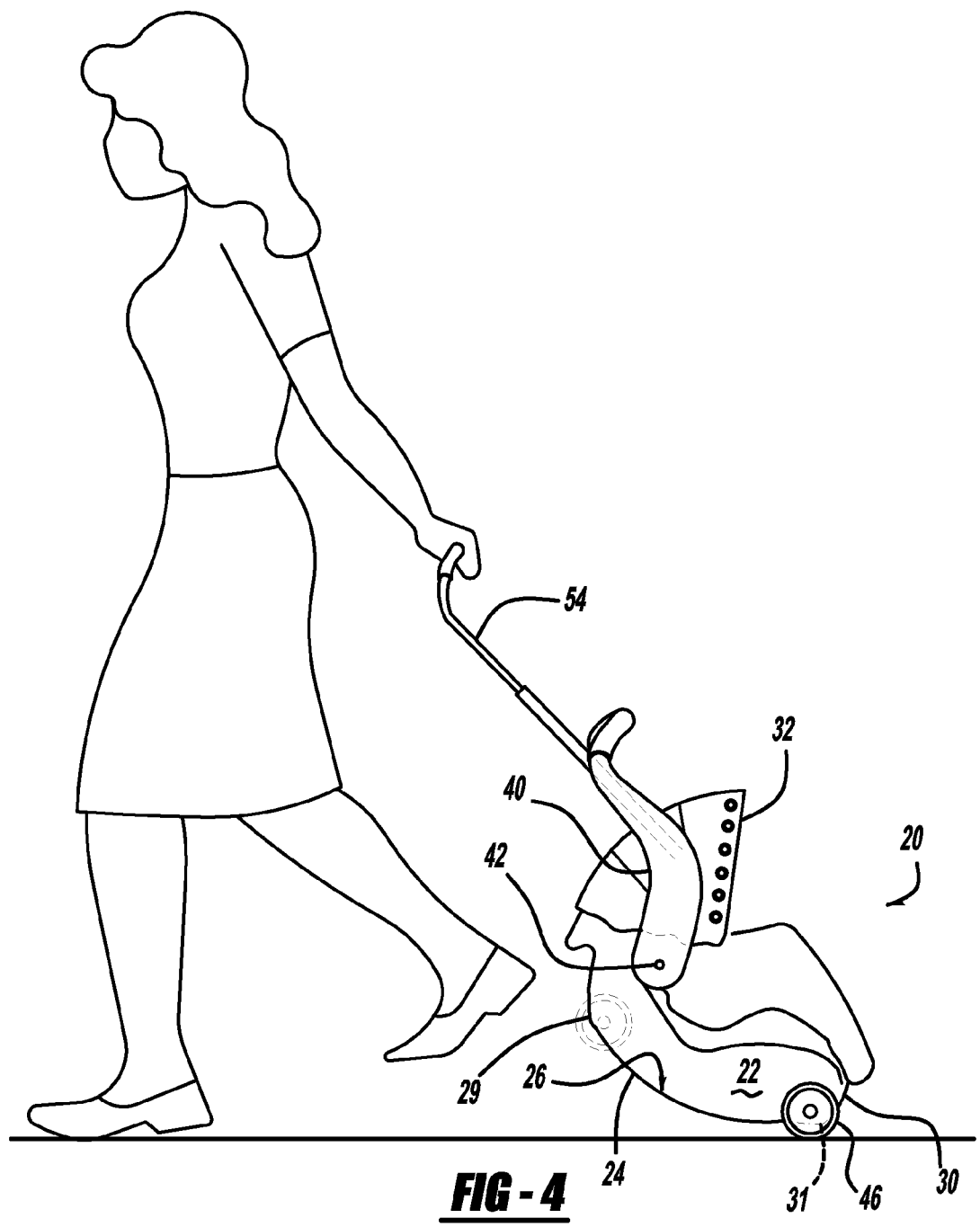
FIG. 4 is a side elevation view of the rolling infant car seat of FIG. 1, after the seat has been removed from the base and the vehicle and further showing the rolling infant car seat being rolled on a floor behind a user.

Preferably, the infant seat 22 has a hood 32. The hood 32 is pivotally attached over the infant area of the infant car seat 22, as shown in FIG. 3. The hood 32 is adapted to alternatively cover a portion of the infant car seat 22 proximal to the head end 28 and proximal to the foot end 30. Thus, the hood 32 may be pivoted from one end of the infant car seat 22 to the other end. Many prior art infant car seats have toys hanging from their handle. When the rolling infant car seat 20 described herein is pulled and rolled on its wheels 46, as shown in FIG. 4, the cross piece of the handle is no longer positioned to suspend toys within the vicinity of the infant. The hood 32 of the rolling infant car seat 20 may be pivoted proximal to the foot end 30 of the rolling infant car seat when the seat 20 is being pulled along a floor 36. Preferably, one or more child toys 34 are hung from the hood 32 such that the infant may interact with the one or more child toys 34. In other words, at least one toy 34 is positioned on the hood 32 such that a child within the infant car seat 22 may interact with the toy 34 when the hood 32 is pivoted such that it covers the foot end 28 of the infant car seat 22.

Figure 5:
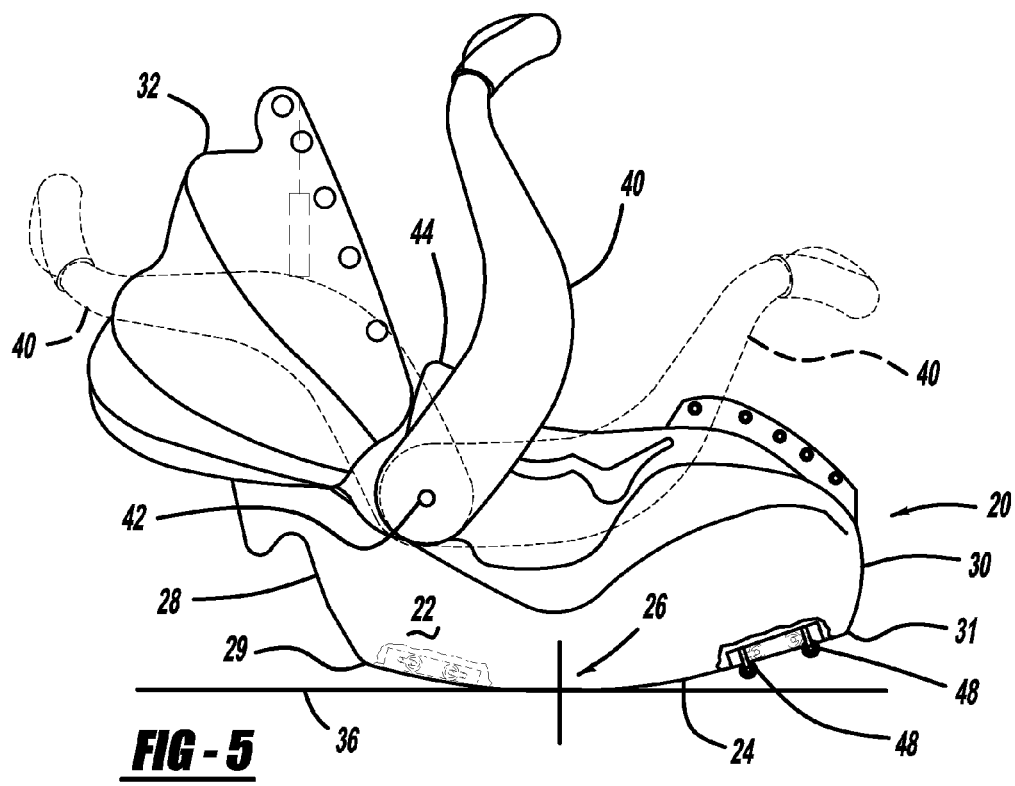
FIG. 5 is a side elevation view of a rolling infant car seat having retractable wheels.

The handle 40 is pivotally attached through a pivot axis to the infant seat 22. The handle 40 may be attached to the seat 22 with a pin 42 to permit pivotal movement of the handle 40. The handle 40 is adapted to have a plurality of locked positions about the pivot axis, as shown in FIG. 3, FIG. 4 and FIG. 5. The handle 40 and infant seat 22 are adapted to provide a plurality of handle 40 positions. Each position of the handle 40 is lockable by a spring-loaded lock. The spring-loaded lock may be released by compressing a lock button 44 contained within the handle 40. Compressing the lock button 44 disengages the handle 40 from the infant car seat 20 and permits the handle to be pivoted into the plurality of positions described. When the lock button 44 is decompressed the spring-loaded lock secures the handle 40 to the infant car seat 22.

Figure 7:
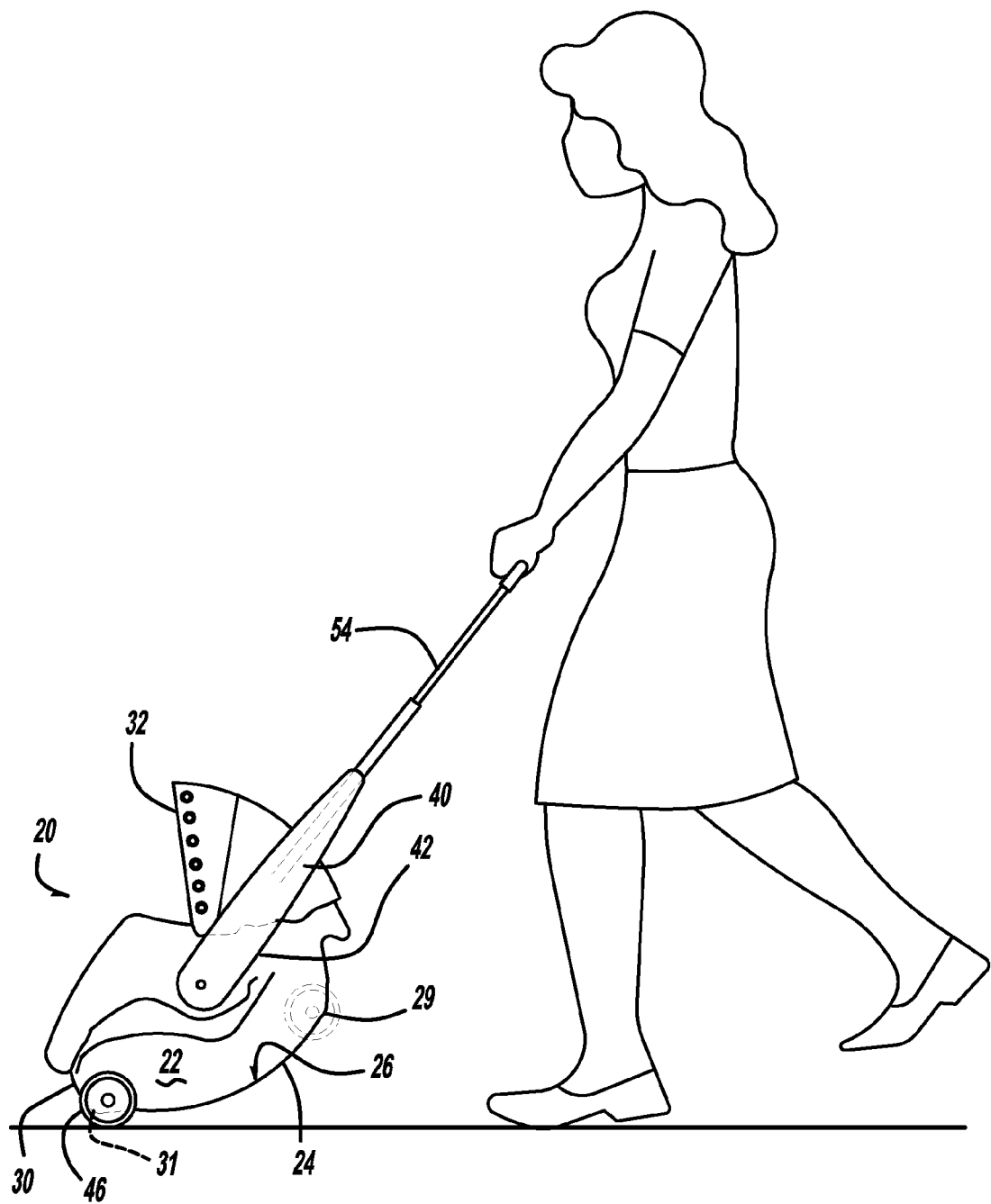
FIG. 7 is a side elevation view of an alternate embodiment of a rolling infant car seat showing the rolling infant car seat being pushed in front of a user.

At least one wheel 46 is positioned along the curved bottom surface 24 of the seat 22. The wheel 46 is positioned between the floor contact area 26 and a peripheral edge 31, 29 of the curved bottom surface 24 of the infant car seat 22, as shown in FIG. 3 and FIG. 7. The at least one wheel 46 is sized, shaped and positioned such that the at least one wheel 46 will fit within the base 38 when the infant seat 22 is securely fit within the base 28, as shown in FIG. 1. The at least one wheel 46 is sized, shaped and positioned such that it will permit rocking of the infant car seat 22 on the curved bottom surface 24 when the infant car seat 22 rests upon a floor surface 36, as shown in FIG. 3. The at least one wheel 46 is also sized, shaped and positioned such that it will permit the infant car seat 22 to be propelled on the at least one wheel 46 when the curved surface 24 is lifted above the floor surface 36 while the at least one wheel 46 remains in contact with the floor surface 36, as shown in FIG. 4. In a preferred embodiment of the rolling infant car seat 20 two wheels 46 are coaxially attached to the bottom surface 24 of the infant car seat proximal to the foot end 30 of the infant car seat 22. FIG. 3 is a side elevation view showing one wheel 46 attached to one side of the foot end 30 of the infant car seat 22. The other wheel 44 is symmetrically attached to the other side of the foot end 30 of the infant car seat 22. Each wheel 46 satisfies the described size, shape and position criteria.

FIG. 7 shows an alternate embodiment of a rolling infant car seat 20. One pair of wheels 46 are positioned along the curved bottom surface 24 between the floor contact area 26 and the foot end peripheral edge 31 of the curved bottom surface 24 of the infant car seat 22. Another pair of wheels 46 are positioned along the curved bottom surface 24 between the floor contact area 26 and the head end peripheral edge 29 of the curved bottom surface 24 of the infant car seat 22. With a pair of wheels 46 positioned near the foot end peripheral edge 31 and a pair of wheels 46 positioned near the head end peripheral edge 29, the user may optionally elect to engage the head end 28 peripheral wheels 46 which would create a more reclined seat position conducive for a sleeping infant while the user pushes or pulls the infant seat 20. Alternatively, the user may engage the foot end 30 peripheral wheels 46 while pulling or pushing the infant 20 seat which would result in an upright seat position. If the rolling infant car seat 20 is equipped with retractable wheels 48, the retractable wheels 48 may be adapted such that the user may optionally elect to engage all wheels 48 located on the bottom surface 24 simultaneously. In this instance each retractable wheel 48 should have at least two extended positions—one for rocking and one wherein all retractable wheels 48 would simultaneously engage the floor surface 36.

The secondary extendable handle 54 is adapted to be able to be recessed within the handle 40 and extendable from the handle 40, as shown in FIG. 1 and FIG. 4. The secondary extendable handle 54 is attached to the handle 40. The secondary handle 54 is adapted and configured to collapse and fit within the handle 40, as shown in FIG. 1. The secondary handle 54 is also adapted and configured to extend and project from the handle 40, as shown in FIG. 4. At the option of the user, the secondary handle 54 may be fit within the handle 40, or it may be extended from the handle 40.

As previously described, the handle 40 may be rotated and locked into a plurality of positions. One locked position of the handle about the pivot axis of the handle is set to permit the infant car seat 22 to be lifted by the handle 40, while an infant remains securely positioned therein. This is similar to prior art infant car seat configurations which allow an infant to be carried within the infant car seat by lifting and carrying the car seat at the handle. Another locked position of the handle 40 about the pivot axis of the handle is set to permit a standing user grasping the secondary extendable handle 54, which has previously been extended from the handle 40, to lift the curved bottom surface 24 of the infant car seat 22 off of the floor surface 36 while maintaining contact between the at least one wheel 46 and the floor surface 36, as shown in FIG. 4. This permits the infant car seat 22 to be propelled along the floor surface 36 when the user ambulates. Thus, the user may pull the infant car seat 22 on its wheels.

A rolling infant car seat 20 may be fabricated without a secondary handle 54. The (primary or only) handle 40 should be a telescoping handle. A telescoping handle 40 has a compressed configuration, as shown in FIG. 1, and a telescoped configuration, as shown in FIG. 7. The telescoped configuration is an extended configuration.

Figure 6:
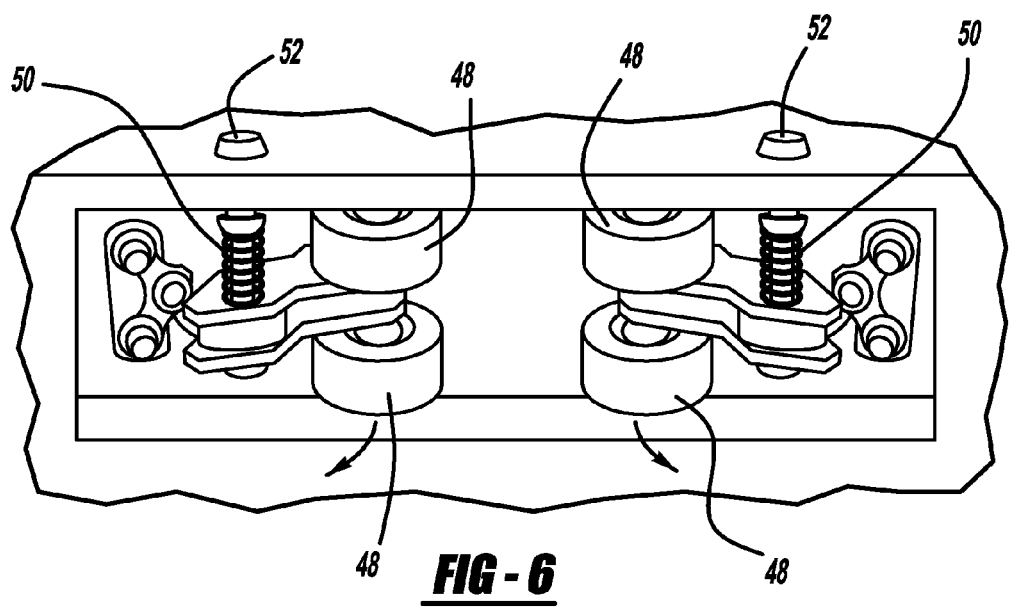
FIG. 6 is a detail view of the retractable wheels shown in FIG. 5.

Optionally, the at least one wheel 46 may be a retractable wheel 48, instead of a fixed position wheel. FIG. 5 and FIG. 6 show the implementation of retractable wheels 48. The retractable wheels 48 retract within the body of the infant car seat 22 when they are not needed. The retractable wheels 48 are spring-loaded. The spring is biased to project the retractable wheels 48 out of the body of the infant car seat 22. A release button 52 is adapted and configured to cause the retractable wheels 48 to be retained within the body of the infant car seat 22 unless the release button 52 is compressed. When the release button 52 is compressed the retractable wheels 48 are forced by the spring from a retracted position, as shown in FIG. 6, to an extended position as shown in FIG. 5. The retractable wheels 48 may be placed back into the retracted position by the user manually compressing the retractable wheels 48 into a retracted position, as shown in FIG. 6. The release button 52 is configured to cause the retracted wheels 48 to remain retracted until the release button 52 is compressed again. The use of retractable wheels 48 increases the angle through which the infant car seat 22 may be rocked when the infant car seat 22 is placed upon a floor surface 36. This is because the retracted wheels 48 do not limit the forward rocking position of the infant car seat 22, as the nonretractable wheels 46 do. FIG. 3 shows that a nonretractable wheel 46 will limit the forward rocking position of the infant car seat 22. One pair of retractable wheels 48 may be positioned near the head end 30 of the infant seat 22 and another pair of retractable wheels 48 may be positioned near the foot end 30 of the infant seat 22, as shown in FIG. 5. This will permit the rolling infant car seat 20 to be either pushed or pulled by a user, while the infant is either in a reclined sleeping position or a more upright position.

Figure 2:
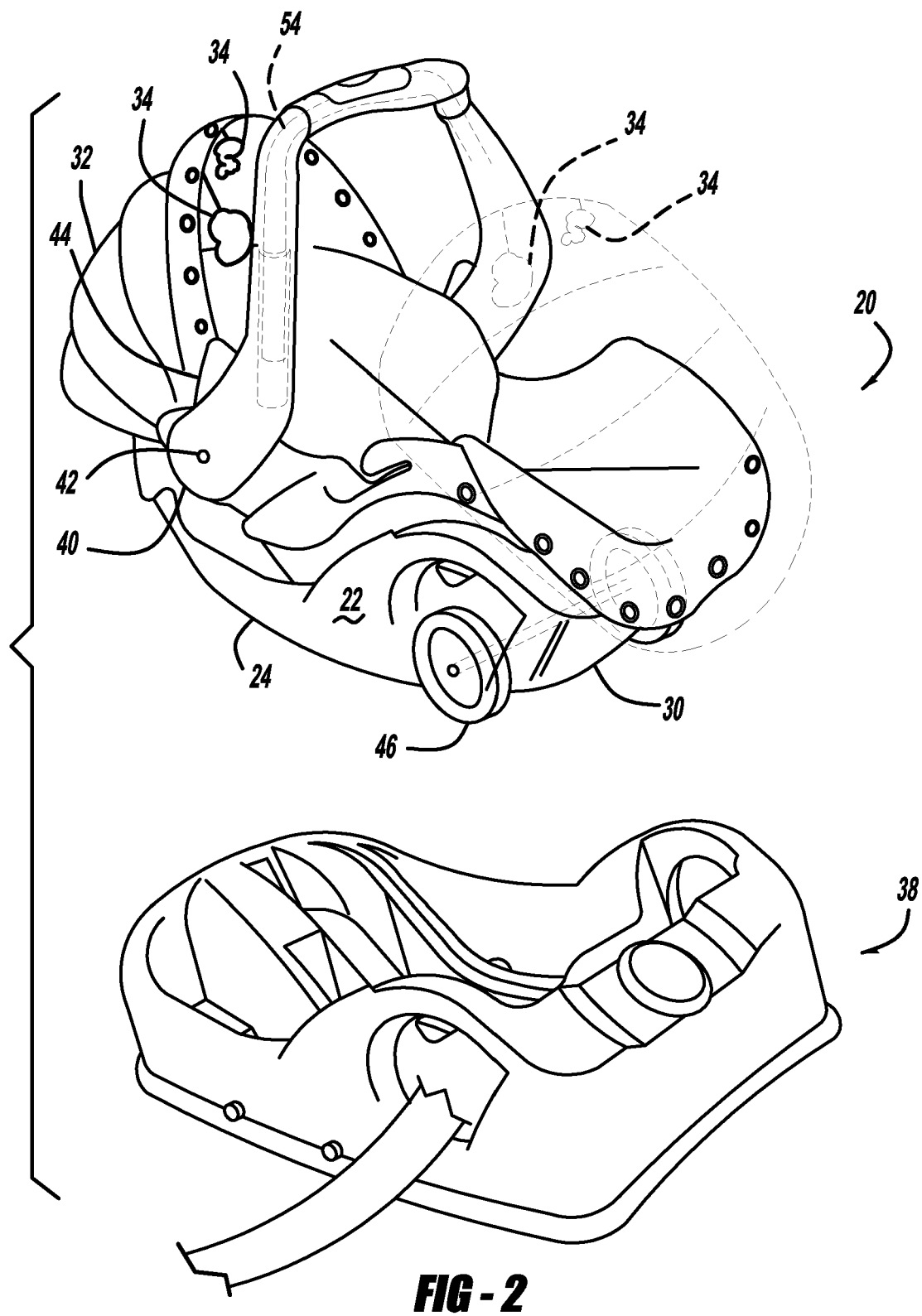
FIG. 2 is an exploded perspective view of the rolling infant car seat and the base of FIG. 1.

The rolling infant car seat 20 may be used as a conventional infant car seat. An infant may be placed within the infant car seat 22 and the infant car seat 22 may be secured into a base 38 which has been previously secured to a motor vehicle by a seat belt. This configuration is shown in FIG. 1, without the infant. After the user's travels have ended the infant car seat 22 may be removed from the base just as in the case of a prior art infant car seat. The handle 40 may then be locked into a position, such as that shown in FIG. 2, and the infant transported by carrying the infant car seat 22 by the handle 40. This is similar to the manner within which traditional infant car seats have been used. Manually carrying an infant in this manner quickly becomes tiring and fatiguing to a user. Instead of carrying the infant car seat 22 by the handle 40, the infant car seat may be placed upon the ground 36. There, the infant may be soothed and relaxed by rocking the infant car seat 22. If the user decides to walk, the handle 40 is rotated and locked into a position similar to that shown in FIG. 4. The secondary extendable handle 54 is then extended from the handle 40. The user lifts the curved bottom surface 24 off of the ground 36 and begins to walk, as shown in FIG. 4. Thus the infant car seat 22 becomes a rolling infant car seat 20. If the rolling infant car seat 20 is equipped with retractable wheels 48, those wheels 48 should be retracted when the infant car seat 22 is secured within a base 38, as shown in FIG. 1, or when it is desired to rock the infant within the infant car seat 22, as shown in FIG. 3. When it is desired to transport the rolling infant car seat 20 by pulling it on its wheels, as shown in FIG. 4, the retractable wheels 48 should be extended. After the transport is concluded, the retractable wheels 48 should be retracted within the body of the infant car seat 20. When the handles 40, 48 are positioned for rolling the rolling infant car seat 22, the hood 32 should be pivoted over the foot end 30 of the infant car seat 22, as shown in FIG. 4 and in phantom in FIG. 2. This will permit the infant to interact with any toy 34 suspended from the hood 32.

The rolling infant car seat 20 described herein has many advantages and benefits. It releasably fits within a base 38 secured within a motor vehicle. It can be carried by its handle 40 in the same manner that traditional infant seats can be carried by a handle. It can be rocked when placed upon the floor in the same manner that traditional infant seats can be rocked when placed upon a floor. The wheels 46 and handle 40 of the rolling infant car seat 20 permit it to be rolled and transported upon a floor 36 when pulled or pushed by a user. This provides a tremendous benefit to a mother desiring to transport her infant by walking moderate to long distances. Even when the position of the handle 40 is changed for rolling transport, the infant may continue to be entertained by toys 34 suspended from the hood 32. If the rolling infant car seat 20 is equipped with retractable wheels 48, a greater degree of rocking is available and a better fit within the base 38 can result.

Although the invention has been shown and described with reference to certain preferred embodiments, those skilled in the art undoubtedly will find alternative embodiments obvious after reading this disclosure. With this in mind, the following claims are intended to define the scope of protection to be afforded the inventor, and those claims shall be deemed to include equivalent constructions insofar as they do not depart from the spirit and scope of the present invention.

What is claimed is:

1. A rolling infant car seat comprising:
    (a) an infant car seat which securely fits within a base, said infant car seat having a bottom surface, a head end and a foot end, said bottom surface having a floor contact area;

(b) a handle attached to the infant seat;
(c) at least one wheel positioned along the bottom surface between the floor contact area and a peripheral edge of the bottom surface of the infant car seat, said at least one wheel being sized, shaped and positioned such that the at least one wheel will permit the infant car seat to be propelled on the at least one wheel when a part of the bottom surface is lifted above the floor surface while the at least one wheel remains in contact with the floor surface;
(d) wherein one locked position of the handle is set to permit a standing user grasping the handle to lift the bottom surface of the infant car seat off of the floor surface while maintaining contact between the at least one wheel and the floor surface, whereby the infant car seat is propelled along the floor surface when the user ambulates and
(e) wherein the at least one wheel is retractable within the infant car seat.

2. The rolling infant car seat of claim 1, further comprising a hood pivotally attached over the infant area of the infant car seat, said hood having at least one child toy hanging therefrom, said at least one toy being positioned on the hood such that a child within the infant car seat may interact with the at least one toy when the hood is pivoted such that it covers the foot end of the infant car seat.

3. A rolling infant car seat comprising:
(a) an infant car seat which securely fits within a base, said infant car seat having a convexly curved bottom surface for rocking the infant seat along the curved bottom surface, said infant seat having a head end and a foot end, said curved bottom surface having a floor contact area;
(b) a handle pivotally attached through a pivot axis to the infant seat, said handle being adapted to have a plurality of locked positions about the pivot axis;
(c) at least one wheel positioned along the curved bottom surface between the floor contact area and a peripheral edge of the curved bottom surface of the infant car seat, said at least one wheel being sized, shaped and positioned such that the at least one wheel will fit within the base when the infant seat is securely fit within the base, will permit rocking of the infant car seat on the curved bottom surface when the infant car seat rests upon a floor surface and will permit the infant car seat to be propelled on the at least one wheel when the curved surface is lifted above the floor surface while the at least one wheel remains in contact with the floor surface;
(d) a secondary extendable handle adapted to be able to be recessed within the handle and extendable from the handle, said secondary extendable handle being attached to the handle;
(e) wherein one locked position of the handle about the pivot axis is set to permit the infant car seat to be lifted by the handle while an infant remains securely positioned therein; and
(f) wherein another locked position of the handle about the pivot axis is set to permit a standing user grasping the secondary extendable handle extended from the handle to lift the curved bottom surface of the infant car seat off of the floor surface while maintaining contact between the at least one wheel and the floor surface, whereby the infant car seat is propelled along the floor surface when the user ambulates.

4. The rolling infant car seat of claim 3, wherein the at least one wheel is retractable within the infant car seat.

5. The rolling infant car seat of claim 4, further comprising a hood pivotally attached over the infant area of the infant car seat, said hood having at least one child toy hanging therefrom, said at least one toy being positioned on the hood such that a child within the infant car seat may interact with the at least one toy when the hood is pivoted such that it covers the foot end of the infant car seat.

6. The rolling infant car seat of claim 3, farther comprising a hood pivotally attached over the infant area of the infant car seat, said hood having at least one child toy hanging therefrom, said at least one toy being positioned on the hood such that a child within the infant car seat may interact with the at least one toy when the hood is pivoted such that it covers the foot end of the infant car seat.

7. The rolling infant car seat of claim 3, wherein the at least one wheel is positioned along the curved bottom surface between the floor contact area and the foot end peripheral edge of the curved bottom surface of the infant car seat.

8. The rolling infant car seat of claim 7, further comprising a pair of wheels positioned along the curved bottom surface between the floor contact area and the foot end peripheral edge of the curved bottom surface of the infant car seat.

9. The rolling infant car seat of claim 3, wherein the at least one wheel is positioned along the curved bottom surface between the floor contact area and the head end peripheral edge of the curved bottom surface of the infant car seat.

10. The rolling infant car seat of claim 9, further comprising a pair of wheels positioned along the curved bottom surface between the floor contact area and the head end peripheral edge of the curved bottom surface of the infant car seat.

11. The rolling infant car seat of claim 3, wherein at least one wheel is positioned along the curved bottom surface between the floor contact area and the foot end peripheral edge of the curved bottom surface of the infant car seat and another wheel is positioned along the curved bottom surface between the floor contact area and the head end peripheral edge of the curved bottom surface of the infant car seat.

12. The rolling infant car seat of claim 3, further comprising a pair of wheels positioned along the curved bottom surface between the floor contact area and the foot end peripheral edge of the curved bottom surface of the infant car seat and a pair of wheels positioned along the curved bottom surface between the floor contact area and the head end peripheral edge of the curved bottom surface of the infant car seat.

13. A rolling infant car seat comprising:
(a) an infant car seat which securely fits within a base, said infant car seat having a convexly curved bottom surface for rocking the infant seat along the curved bottom surface, said infant seat having a head end and a foot end, said curved bottom surface having a floor contact area;
(b) a telescoping handle pivotally attached through a pivot axis to the infant seat, said handle being adapted to have a plurality of locked positions about the pivot axis;
(c) at least one wheel positioned along the curved bottom surface between the floor contact area and a peripheral edge of the curved bottom surface of the infant car seat, said at least one wheel being sized, shaped and positioned such that the at least one wheel will fit within the base when the infant seat is securely fit within the base, will permit rocking of the infant car seat on the curved bottom surface when the infant car seat rests upon a floor surface and will permit the infant car seat to be propelled on the at least one wheel when the curved surface is lifted above the floor surface while the at least one wheel remains in contact with the floor surface;

(d) wherein one locked position of the handle about the pivot axis is set to permit the infant car seat to be lifted by the handle while an infant remains securely positioned therein; and (e) wherein another locked position of the handle about the pivot axis is set to permit a standing user grasping the telescoping handle to lift the curved bottom surface of the infant car seat off of the floor surface while maintaining contact between the at least one wheel and the floor surface, whereby the infant car seat is propelled along the floor surface when the user ambulates.

14. The rolling infant car seat of claim 13, wherein the at least one wheel is retractable within the infant car seat.

15. The rolling infant car seat of claim 14, further comprising a hood pivotally attached over the infant area of the infant car seat, said hood having at least one child toy hanging therefrom, said at least one toy being positioned on the hood such that a child within the infant car seat may interact with the at least one toy when the hood is pivoted such that it covers the foot end of the infant car seat.

16. The rolling infant car seat of claim 13, farther comprising a hood pivotally attached over the infant area of the infant car seat, said hood having at least one child toy hanging therefrom, said at least one toy being positioned on the hood such that a child within the infant car seat may interact with the at least one toy when the hood is pivoted such that it covers the foot end of the infant car seat.

17. The rolling infant car seat of claim 13, wherein the at least one wheel is positioned along the curved bottom surface between the floor contact area and the foot end peripheral edge of the curved bottom surface of the infant car seat.

18. The rolling infant car seat of claim 17, further comprising a pair of wheels positioned along the curved bottom surface between the floor contact area and the foot end peripheral edge of the curved bottom surface of the infant car seat.

19. The rolling infant car seat of claim 13, wherein the at least one wheel is positioned along the curved bottom surface between the floor contact area and the head end peripheral edge of the curved bottom surface of the infant car seat.

20. The rolling infant car seat of claim 19, further comprising a pair of wheels positioned along the curved bottom surface between the floor contact area and the head end peripheral edge of the curved bottom surface of the infant car seat.

21. The rolling infant car seat of claim 13, wherein at least one wheel is positioned along the curved bottom surface between the floor contact area and the foot end peripheral edge of the curved bottom surface of the infant car seat and another wheel is positioned along the curved bottom surface between the floor contact area and the head end peripheral edge of the curved bottom surface of the infant car seat.

22. The rolling infant car seat of claim 13, further comprising a pair of wheels positioned along the curved bottom surface between the floor contact area and the foot end peripheral edge of the curved bottom surface of the infant car seat and a pair of wheels positioned along the curved bottom surface between the floor contact area and the head end peripheral edge of the curved bottom surface of the infant car seat.

\* \* \* \* \*